H. B. WYCKOFF.
CORN HARVESTER.
APPLICATION FILED DEC. 4, 1906.

995,836.

Patented June 20, 1911.

Witnesses
A. G. Hague
S. F. Christy.

Inventor
H. B. Wyckoff.
by Owig & Lam Attys

H. B. WYCKOFF.
CORN HARVESTER.
APPLICATION FILED DEC. 4, 1906.

995,836.

Patented June 20, 1911.
5 SHEETS—SHEET 5.

Witnesses
A. G. Hague.
S. F. Christy.

Inventor
H. B. Wyckoff.
by Owing & Lane Atty's

UNITED STATES PATENT OFFICE.

HERBERT B. WYCKOFF, OF CENTERVILLE, IOWA.

CORN-HARVESTER.

995,836.  Specification of Letters Patent.  Patented June 20, 1911.

Application filed December 4, 1906. Serial No. 346,329.

*To all whom it may concern:*

Be it known that I, HERBERT B. WYCKOFF, a citizen of the United States, residing at Centerville, in the county of Appanoose and State of Iowa, have invented a certain new and useful Corn-Harvester, of which the following is a specification.

This invention relates to that class of corn harvesters that are advanced over a field by draft animals and that snap the ears from the stalks standing in the field and then husk the ears and deliver the husked ears to a wagon driven alongside of the harvester.

The objects of my invention are, broadly, to provide a machine of this class that may be operated with comparatively light draft and that will develop a maximum of efficiency in picking up stalks and guiding them to position between the snapping bars and in removing ears from the stalks.

More specifically it is my object to provide improved means for picking up stalks that are lying down in the field or that do not stand in upright positions and for holding said stalks to proper position relative to the harvester until the ears have been removed therefrom.

A further object is to provide improved means for causing the stalks to enter between the snapping bars one at a time and without binding upon the snapping bars or stalk guiding devices so that the snapping bars and stalk guiding devices may be spaced apart slightly farther from the width of the thickest corn stalks, to thereby prevent binding, and in the event that a number of stalks should enter between the forward ends of the guiding devices so close together that they would be likely to bind and wedge between the guiding devices and the snapping bars, the said stalks will be automatically separated just after their entrance between the guiding devices and caused to enter between the snapping bars one at a time.

A further object is to provide improved means of simple, durable and inexpensive construction for guiding the conveyer chains during their rearward movement so the arms thereon may engage the stalks and hold them upright and so that the chains supporting said arms will be protected and travel freely and without binding.

A further object is to provide improved means for snapping ears of corn from the stalks, which snapping devices may be adjusted to suit the requirements of corn under all of the various conditions ordinarily found and in this connection to provide means for first placing all of the ears in such position that the snapping bars, when actuated, will engage the ears in such manner as to snap them from the stalks with a minimum of power.

A further object is to provide improved means for conducting the ears, after they have been removed from the stalks, to a point of discharge over the husking rollers.

My invention consists in certain details in the construction, arrangement and combination of the various parts of the device, whereby the objects contemplated are attained, as hereinafter more fully set forth, pointed out in my claims and illustrated in the accompanying drawings, in which—

*The machine frame.*—The main frame is indicated by the reference numeral 10 and is mounted upon the axle 11 to which the traction wheel 12 is fixed, which traction wheel furnishes power for operating all of the various parts of the machine. At the forward end of the frame 10 is a pivoted tongue 13 to which the draft animals are attached. The numeral 14 indicates a supplemental machine frame arranged directly to the left of the main frame and mounted upon an axle 15 to which a supporting wheel 16 is fixed. The wheels 12 and 16 are arranged in line with each other and the machine may be tilted to move its forward end either upwardly and downwardly by means of a lever 17 fulcrumed to the frame 10 and provided with a spring-actuated pawl 18 to engage a sector 19. The crank arm 20 connected with the lever 17 is pivoted to a rod 21 which in turn is pivoted to a bell-crank lever 22 and a link 23 connects said bell-crank lever with the tongue in front of its pivotal point. Obviously by a manipulation of the lever 17, the forward end of the machine frame may be tilted. I provide for connecting the frames 10 and 14 by means of two arched tubes 24 and 25 which have their lower ends firmly fixed to said frame members, said arches being extended upwardly high enough to clear the tops of the corn stalks. At the upper portions of the arched tubes are the side rails 26 which connect the two arched tubes with each other and firmly support and brace them. These rails also serve to support some of the operative parts of the machinery hereinafter described. In this way the stalks standing in the field are permitted to pass through between the frames 14 and 10, as the machine is advanced over a field.

Figure 1:
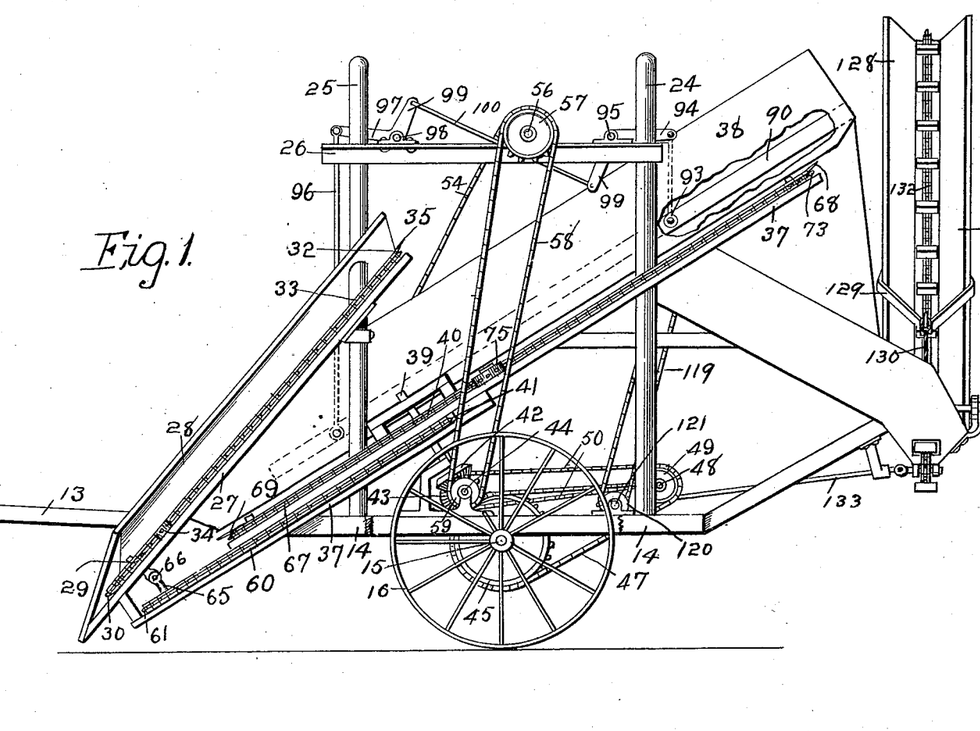
Figure 1 shows a side elevation of the complete harvesting machine embodying my invention.
Figure 2:
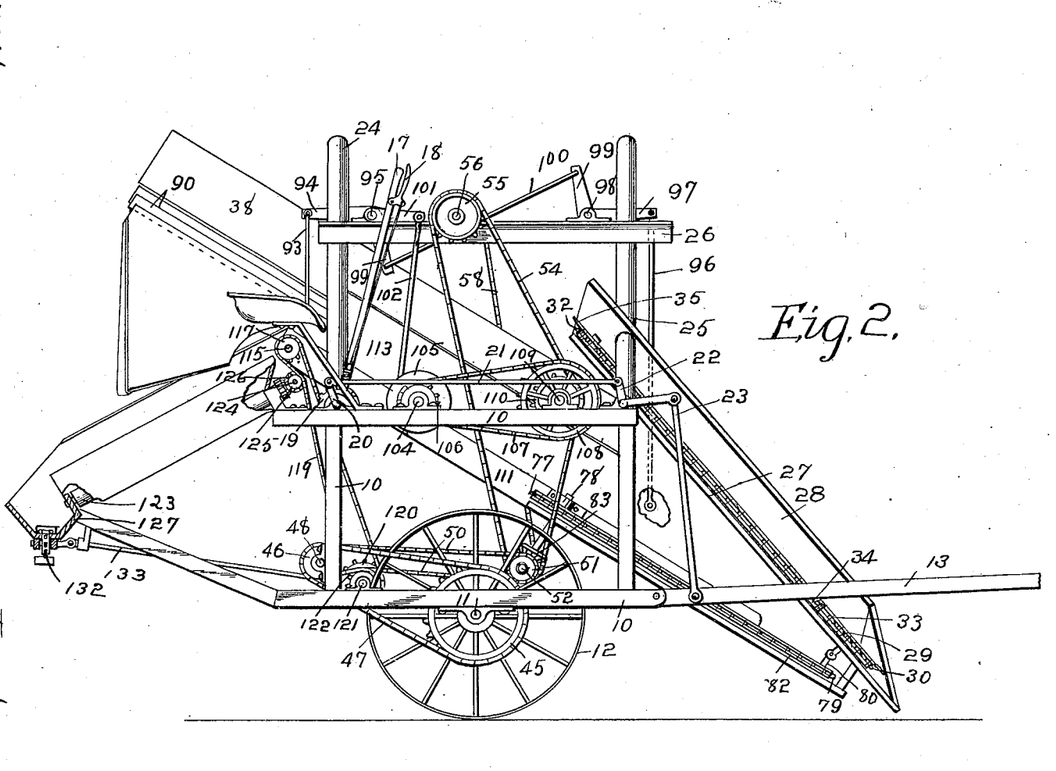
Fig. 2 shows a side elevation of the complete harvester embodying my invention and taken from the opposite side of the machine from that of Fig. 1, a portion of the rear conveyer being removed.
Figure 3:
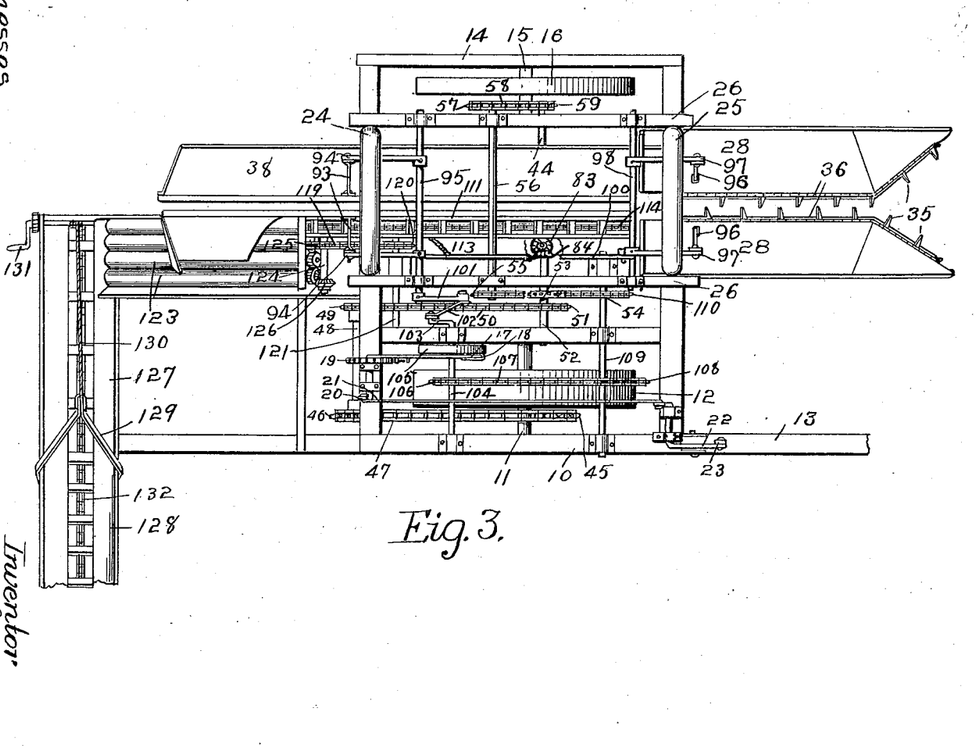
Fig. 3 shows a top or plan view of the complete harvester embodying my invention.
Figures 4, 5:
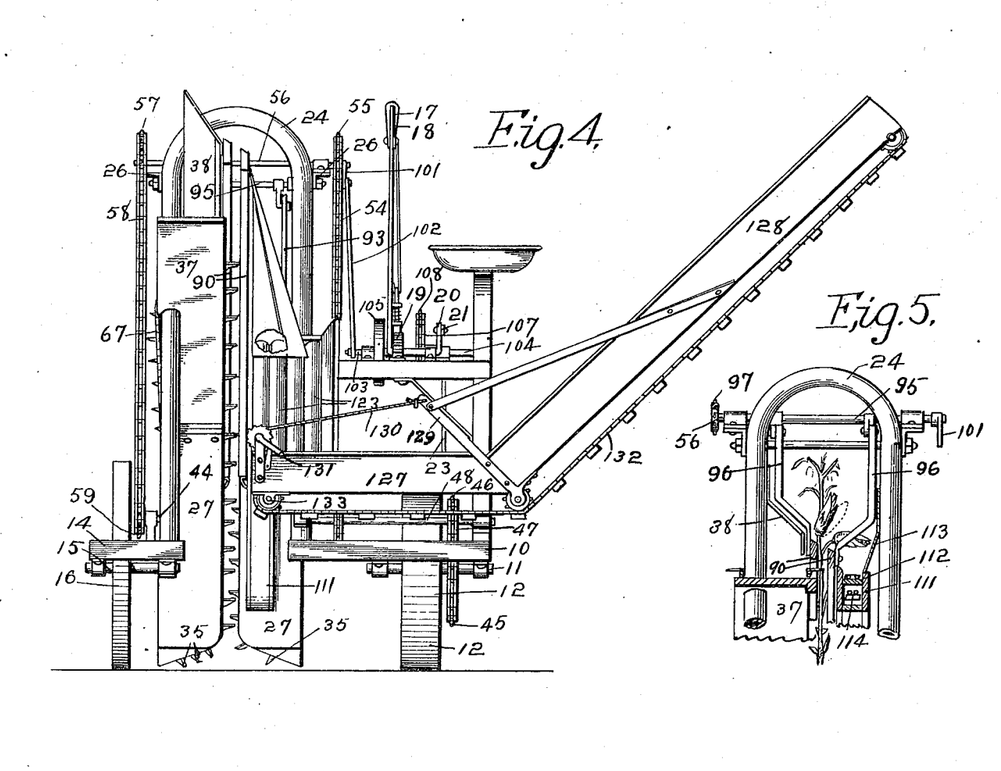
Fig. 4 shows a rear end elevation of the complete harvester.
Fig. 5 shows a detail, transverse, sectional view through a portion of the machine frame, illustrating the snapping bars and the means for supporting and elevating them and the arrangement of the conveyer chains for holding the stalks in position between the snapping bars and also the conveyer for carrying the severed ears to the husking rollers.
Figures 6, 7, 8, 9, 10, 11, 12:
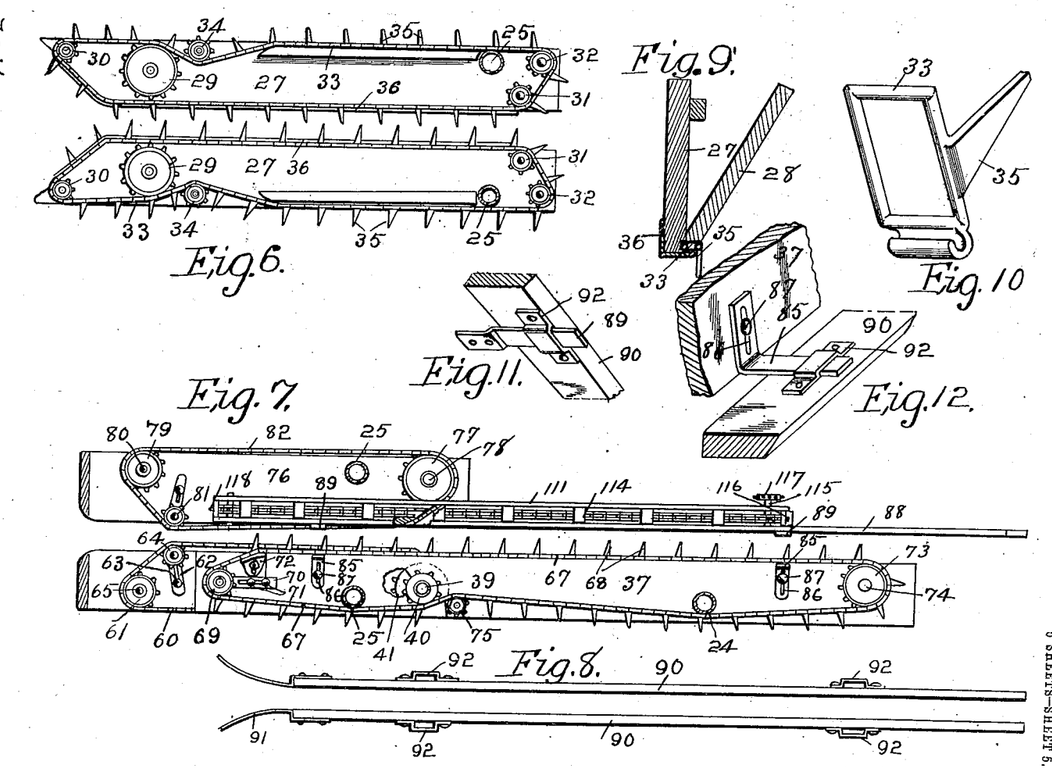
Fig. 6 shows a detail plan view illustrating the upper conveying devices for gathering the stalks and guiding them to an upright position between the snapping bars.
Fig. 7 shows a detail plan view of the lower conveyer for holding the stalks upright as they pass between the snapping bars and also showing the means for separating the stalks so that they will enter between the snapping bars one at a time and also showing the conveyer for delivering the severed ears to the husking rollers.
Fig. 8 shows a plan view of the snapping bars.
Fig. 9 shows an enlarged sectional view of one of the frames for the upper stalk gathering and guiding devices, illustrating the means for receiving and guiding the conveyer chains having the outwardly projecting arms.
Fig. 10 shows a detail perspective view of one of the links of the stalk engaging conveyer chains provided with a laterally projecting arm.
Fig. 11 shows a detail perspective view illustrating one of the guiding devices for one of the snapping bars.
Fig. 12 shows a detail perspective view of the guiding device for the other snapping bar and also the means for adjusting said snapping bar toward or from the one shown in Fig. 11.

*The stalk gathering and guiding devices.*—The means for picking up stalks that do not stand in upright positions and for guiding said stalks to position between the snapping bars, comprises two frames, one arranged to stand on each side of a row of corn and each comprising a flat bottom member 27 and a guard plate 28 fixed at its inner edge to the bottom member and inclined upwardly and outwardly therefrom. The frame thus formed is fixed at its rear end to the tubular arch 25 and it is inclined downwardly and forwardly to a point close to the ground surface. Mounted near the forward end of the frame below the guard plate 28 is a driving sprocket wheel 29 operated by power from the traction wheel, as will hereinafter appear. The forward end of the frame is inclined outwardly and forwardly from the inner edge thereof and at the outer forward corner is an idler sprocket wheel 30. Two idler sprocket wheels 31 and 32 are located at the rear end of the frame and a sprocket chain 33 is passed around said sprocket wheels, it being held to the driving sprocket wheel 29 by means of a chain tightener sprocket wheel 34 of the ordinary kind. Some of the links of this chain are provided with outwardly projecting arms 35, as shown in Fig. 10, attached to the upper edge of said links. These arms are designed to engage stalks and hold them in upright positions while passing through between the snapping bars and I provide for guiding the chain so that the links will stand in line as follows: Fixed to the under surface of the base piece 27 of the frame is an L-shaped metal bar 36 extending from the forward outer corner of the part 27 along its inner edge to its rear end. The upright portion of the bar 36 stands parallel with the inner edge of the part 27 and spaced apart therefrom far enough to freely admit chain 33, so that when the arms 35 of said chain are in engagement with corn stalks, the chain will be securely held with the links in line.

The lower device for picking up and guiding corn stalks comprises two independent members, on opposite sides of the corn stalk opening through the machine, which members differ in construction and hence will be separately described. The one on the left comprises a base plate 37 extended from a point slightly below and in the rear of the forward end of the upper gathering and guiding device and projects upwardly and rearwardly at a less degree of inclination than the upper gathering and guiding device and extends to a point near the rear of the machine frame. A shield 38 is supported on the machine frame and extends from a point above the inner edge of the plate 37, first straight upwardly, then upwardly and to the left to prevent ears or stalks of corn from bending over and engaging the top of the plate 37. Near the center of the plate 37 is an upright shaft 39 extended through the plate and provided at its upper end with a sprocket wheel 40 and a short distance below its upper end with a sprocket wheel 41. This shaft is driven by means of a bevel gear wheel 42 on its lower end in mesh with the beveled gear wheel 43 on a shaft 44, which shaft is driven from the traction wheel as follows: On the traction wheel axle is a sprocket wheel 45 connected with a sprocket wheel 46 in the rear of the axle 11 by means of a sprocket chain 47. The said sprocket wheel 46 is fixed to a shaft 48 and another sprocket wheel 49 is fixed to the same shaft and connected by a chain 50 with a sprocket wheel 51, which latter sprocket wheel is fixed to the shaft 52.

I provide for transmitting power from the shaft 52 around over the top of the machine frame and down to the sprocket wheel 43 as follows: A sprocket wheel 53 is fixed to the shaft 52 and connected by a sprocket chain 54 with a sprocket wheel 55 fixed to a shaft 56 on top of the machine frame. This shaft extends to the left side of the machine frame and is provided on its left end with a sprocket wheel 57 connected by a chain 58 with a sprocket wheel 59 on the shaft 44. A sprocket chain 60 is passed around the sprocket wheel 41 and also around a sprocket wheel 61 at the front of the plate 37. Mounted upon the plate 37 is a slotted sprocket wheel support 62 adjustably secured to the plate 37 by the bolt 63 and having on one end an idler sprocket wheel 64 to engage the chain 60 and hold it normally projected beyond the inner edge of the plate 37. The said sprocket wheel 61 is mounted upon a shaft 65 which is provided with a joint 66. The sprocket wheel 29, herein before referred to is connected with the shaft 65 and driven thereby.

A sprocket chain 67 is mounted on top of the plate 37 and above the sprocket chain 60 and is provided with laterally projecting arms 68. The forward end portion of this chain passes around an idler sprocket wheel 69 located above and a short distance in the rear of the sprocket wheel 61 and is made adjustable longitudinally by the slotted plate 70 which supports it and which is connected with the plate 37 by the bolts 71. In the rear of the sprocket wheel 69 is an adjustable guide plate 72, which holds the forward portion of the chain to a point in line with the inner edge of the plate 37. At the rear of the plate 37 is an idler sprocket wheel 73 mounted on the shaft 74. The outer portion of the chain 67 is held in engagement with the driving sprocket wheel 40 by means of the chain tightener sprocket wheel 75. This chain 67 is for the purpose of engaging corn stalks and holding them in upright position while they pass through the machine.

On the right side of the opening through the machine through which the corn stalks pass is a gathering and guiding member comprising a base plate 76 similar to the forward portion of the plate 37 on the left side, but extended rearwardly only about half as far as the plate 37. It is provided at its rear end with a driving sprocket wheel 77 fixed to a shaft 78 and at its forward end with a sprocket wheel 79 fixed to a shaft 80. It is also provided with an adjustable idler sprocket 81 similar to the corresponding sprocket on the left side. A chain 82 is passed around these sprocket wheels and the portion of these chains between the sprockets 81 and 64 serve to determine the size of the passageway for the corn stalks through the machine. If it is desired to adjust the machine for small stalks, the sprocket wheels are placed relatively close together but in any event they are so spaced apart as to admit only one corn stalk at a time between them. Hence in the event that a number of corn stalks are brought to the point between these sprocket wheels at the same time, they will be carried through by the sprocket chains only one at a time, thus separating the stalks so that the ears may be more easily removed. I provide for driving the shaft 78 as follows: On the lower end of said shaft is a bevel gear wheel 83 in mesh with a beveled gear wheel 84 fixed to the shaft 52. The shaft 80 has one of the sprocket wheels 29 fixed to its upper end to thereby drive the chain 33.

*The snapping device.*—Mounted upon the plate 37 are two brackets 85 provided with slots 86 through which bolts 87 are passed to adjustably connect said brackets with the plate 37. At the inner end of each bracket is an upwardly projecting guide arm. On the opposite side of the stalk opening through the machine is a frame member 88 to which two upright guide arms 89 are fixed. The snapping bars proper each comprise a straight bar 90 having its top edge beveled upwardly toward the left side of the machine. At the forward end of each bar is a guide arm 91 to project forwardly and outwardly and on the outer face of each bar are two guide loops 92 to receive the guide arms 85 and 89. These bars are arranged with the one on the left side of the machine higher than the one on the right and the bars incline upwardly and rearwardly parallel with the lower gathering and guiding conveyers. By the arrangement shown, these snapping bars are permitted to move only in a vertical direction and if it is desired to adjust one of them to and from the other, this adjustment is done by the bolts 87 in the slotted brackets 85. I have provided for reciprocating these snapping bars vertically during the operation of the machine as follows: Connected with the rear ends of the snapping bars are two hangers 93 which extend upwardly and are attached to crank arms 94 on a rock shaft 95. The forward ends of the snapping bars are connected to the hangers 96 which extend upwardly and are pivoted to the arms 97 on the rock shaft 98. I connect these two rock shafts to work in unison by providing a crank arm 99 on each connected by a link 100. In this way a rocking movement imparted to the rear rock shaft 95 will simultaneously move both of the snapping bars up and down. At the right end of the shaft 95 is a crank arm 101 connected to a pitman 102, which latter is pivoted to the crank arm 103 of a shaft 104 mounted in the machine frame. On this shaft is a balance wheel 105 and a sprocket wheel 106, the latter being connected by a chain 107 with a sprocket wheel 108 on a shaft 109, also mounted in the frame in front of the shaft 104. Said shaft 109 is also provided with a sprocket wheel 110, which is arranged so that the sprocket chain 54 passes around it and imparts a rotary motion to the shaft 109. The size of the sprocket wheels 108 and 106 is such that the speed of the shaft 104 is increased relative to that of the shaft 109. Obviously by this arrangement, an advancing movement of the machine will cause the snapping bars to be rapidly reciprocated in straight vertical movement. The hangers 96 and 93 are spaced apart a considerable distance at their upper ends and are inclined downwardly and then inwardly where they connect to the snapping bars, the advantage of this being that the said arms will not interfere with the tops or ears of corn that pass through between the snapping bars and they may incline to one side or the other. The advantage of having the upper edges of the snapping bars arranged one above the other and beveled as shown, is that when the upper bar first engages an ear of corn, it will engage the ear in a manner tending to bend it over so that it overlaps the lower snapping bar and then when the lower snapping bar strikes the stem of the ear, it will do so with its sharp corner and thus snap the ear from the stem readily and easily and without tending to tear the stalk up by the roots. The advantage of having the snapping bars move straight up and down is that the ears will be snapped off without any such movement of the bars as would tend to throw the ears away from their position hanging over the lower snapping bar. In devices of this kind where snapping bars are used, it is objectionable to have snapping bars given a longitudinal rocking movement for the reason that when such bars engage an ear of corn they have a tendency to move it around to a forwardly or projecting position where the snapping bars cannot readily strike upon the stem of the ear, because if the ears are pulled from the stalk by a straight upward movement of two snapping bars, both applied to the same ear, there would be a tendency to pull the stalk from the ground, but by arranging the snapping bars so that one of them will bend the ear over the other and the other will strike upon the stem of the ear, then the ears are removed with a minimum of power and without danger of tearing up the stalk.

*The corn conveyers.*—Arranged adjacent to the side of the lower snapping bar is a conveyer chute 111 having a partition 112 near its top and having adjacent to its side farthest from the snapping bars a shield 113 to hold ears of corn in the chute. A sprocket chain conveyer 114 is provided to travel rearwardly over the partition 112 and forwardly under it. I have arranged for driving this conveyer chain as follows: In the rear of the chute 111 is a shaft 115 with a sprocket wheel 116 thereon over which the chain passes and also having a sprocket wheel 117 thereon. At the forward end of the conveyer chute is a sprocket wheel 118 over which the conveyer chain passes. The sprocket wheel 117 is driven by means of a chain 119 which passes around a sprocket wheel 120 on the shaft 121 and this shaft 121 is driven by a sprocket wheel 122 thereon in engagement with the chain 50.

*The husking rollers.*—At the delivery end of the conveyer 114, I have arranged two pair of husking rollers 123 of the ordinary kind and driven by means of a shaft 124 having a sprocket wheel 125 in engagement with the chain 119, the said rollers and the shaft 124, both being provided with beveled gears 126 of the ordinary kind.

*The delivering conveyer.*—At the rear of the husking rollers is a conveyer chute 127 which extends laterally and is provided with a hinged extension 128 on its end to project upwardly and laterally. This hinged extension is controlled for purposes of raising and lowering by means of an arm 129 fixed to the extension and connected by a rope 130 with a windlass 131 and in the conveyer chute is a conveyer chain 132 of the ordinary kind driven by power from the shaft 121 through the instrumentality of a beveled gear device, not shown.

In practical use and assuming that the corn harvester is being advanced over a field, the gathering and guiding devices will operate to pick up stalks and hold them in an upright position. By having the upper gathering and guiding devices arranged at a greater angle than the lower ones, it is obvious that the upper ones will tend to straighten out the tops of stalks that may be broken or bent over. Then when the upper snapping bar first strikes an ear of corn, the beveled face thereof will strike upon the ear and will cause it to bend over the lower snapping bar. Then as the machine advances and the lower snapping bars strike forcibly upon the ear, it will quickly sever the ear because the sharp corner thereof will strike upon the stem of the ear. The severed ears will all be carried to the husking roller and after the husks are removed they will be delivered to the delivery conveyer. The construction of the frame is such that a machine of very light weight and of sufficient strength is provided. By spacing the stalk gathering and guiding devices and the snapping bars relatively far apart a machine of very light draft is provided, because there is comparatively little friction upon the stalks of corn. I have provided, as before described, for preventing two stalks from entering the stalk opening in the machine by arranging the sprocket wheels 81 and 64 so that they will be spaced apart just far enough to admit a single stalk between them and after the stalks are thus spaced apart from these sprocket wheels they will be held in such position by the fingers on the conveyers.

In regard to the snapping bars, I am aware that heretofore snapping bars have been supported by means of links pivoted to them, and they have been oscillated on said links. I have found that this arrangement is not satisfactory, as it tends to allow the snapping bars to slide along an ear of corn before snapping it off, and it also tends to throw the ears in various directions. I have discovered that by causing the snapping bars to move straight up and down in a vertical line, they will squarely engage the ears of corn and snap them off quickly and easily, and throw all of the ears in the same directions. In the accompanying claims, by the use of the term "reciprocating them in a straight line up and down," I mean to distinguish from all such movement of the snapping bars as would be occasioned if they were supported on pivoted hangers, which allow them to move in curved lines backwardly and forwardly.

Having thus described my invention, what I claim and desire to secure by Letters Patent of the United States, therefore is—

1. In a corn harvester, a gathering and guiding device comprising two base plates opposite each other, an endless sprocket chain on the forward portion of each base plate, means for supporting said chains and for moving their adjacent portions rearwardly and an endless conveyer chain having laterally projecting arms mounted on one of said base plates and extending from a point near the forward end of said base plates to the rear end thereof, means for operating said endless chain, a conveyer chute arranged above the base plate opposite from the one having a conveyer provided with arms, said chute being open at its top and having an endless conveyer chain therein for moving ears of corn in the chute toward the rear end thereof.

2. In a corn harvester, a gathering and guiding device, comprising a frame, an endless conveyer chain having a portion thereof running along one edge of the frame, laterally projecting arms on the conveyer chains, an angle-bar fixed to the frame and extended adjacent to the same edge of the frame, said angle bar and the adjacent edge of the frame forming a groove between them to receive the chain.

3. In a corn harvester, the combination of a pair of snapping bars, means for jointly moving them up and down, and means for limiting said movement so that the snapping bars will move straight up and down.

4. In a corn harvester, the combination of two snapping bars spaced apart, and means for moving and guiding said bars so arranged that they will be jointly reciprocated straight up and down.

5. In a corn harvester, the combination of a pair of snapping bars, each provided with guide loops, and stationary rods arranged vertically and designed to receive said guide loops, and means for jointly reciprocating the snapping bars vertically.

6. In a corn harvester, the combination with stalk gathering and guiding devices, of a pair of snapping bars, supporting arms therefor attached to the snapping bars and extended away from each other laterally with respect to the bars and upwardly, two rock shafts supported above the snapping bars, arms thereon having said supporting arms pivoted thereto and means for jointly rocking said shafts.

7. In a corn harvester, the combination with stalk gathering and guiding devices, of a pair of snapping bars, supporting arms therefor attached to the snapping bars and extended away from each other laterally with respect to the bars and upwardly, two rock shafts supported above the snapping bars, arms thereon having said supporting arms pivoted thereto, a crank arm extended downwardly from one of said rock shafts, a crank arm extended upwardly from the other, a rod connecting said crank arms and means for rocking one of said rock shafts.

8. In a corn harvester, the combination with stalk gathering and guiding devices, of a pair of snapping bars, supporting arms therefor attached to the snapping bars and extended away from each other laterally with respect to the bars and upwardly, two rock shafts supported above the snapping bars, arms thereon having said supporting arms pivoted thereto, a crank arm extended downwardly from one of said rock shafts, a crank arm extended upwardly from the other, a rod connecting said crank arms, a crank shaft, means for operating it, a crank arm on said shaft, a pitman connected with said crank arm and a crank arm on one of said rock shafts having said pitman connected with it and a balance wheel on said crank shaft.

9. In a corn harvester, the combination of a stalk gathering and guiding device, comprising two base plates arranged opposite each other, endless conveyer chains on said base plates, their adjacent portions arranged to move rearwardly and spaced apart to admit a single corn stalk between them, an endless conveyer chain having laterally projecting arms arranged above and in the rear of one of the first mentioned conveyer chains and extended rearwardly, two base plates arranged opposite each other with their forward ends adjacent to and above the forward ends of the aforesaid base plates and extended upwardly and rearwardly divergent from the first-mentioned base plates, and endless conveyer chains therein having laterally projecting arms, the upper pair of conveyer chains having their adjacent portions separated more widely than the adjacent portions of the lower conveyer chains.

10. In a corn harvester, the combination of a pair of snapping bars, means for moving them up and down, and means for limiting said movement so that the snapping bars will move straight up and down.

Des Moines, Iowa, November 21, 1906.

HERBERT B. WYCKOFF.

Witnesses:
IMMER FOWLER,
J. V. LESENEY.

Copies of this patent may be obtained for five cents each, by addressing the "Commissioner of Patents, Washington, D. C."